UNITED STATES PATENT OFFICE.

EDWARD CHARLES CORTIS STANFORD, OF DALMUIR, COUNTY OF DUMBARTON, SCOTLAND.

MANUFACTURE OF USEFUL PRODUCTS FROM SEA-WEED.

SPECIFICATION forming part of Letters Patent No. 341,072, dated May 4, 1886.

Application filed January 2, 1886. Serial No. 187,417. (No specimens.) Patented in England January 12, 1881, No. 142, and in France July 1, 1881, No. 143,736.

*To all whom it may concern:*

Be it known that I, EDWARD CHARLES CORTIS STANFORD, of Dalmuir, in the county of Dumbarton, Scotland, manufacturing chemist, have invented new and useful Improvements in the Manufacture of Useful Products from Sea-Weeds, of which the following is a full, clear, and exact description, (and for which I have obtained Letters Patent in Great Britain, dated January 12, 1881, No. 142, and Letters Patent in France, dated July 1, 1881, No. 143,736,) of which the following is a specification.

My said invention has for its object the manufacture or treatment of sea-weeds in a new and improved manner, whereby, in addition to the products ordinarily prepared from such materials, there are also obtained certain new products which are susceptible of important applications in various arts or manufactures.

In carrying out my invention almost any kind of sea-weed, but by preference the kind known as "laminaria," is taken in the fresh or more or less dried state, or when partially fermented, or after more or less exposure to sun and rain, and by preference, after being cut up or reduced by a pulping or other suitable machine, is lixiviated in ordinary coupled wooden or other vats with cold or more or less heated water. The salts thereby extracted are boiled down and carbonized or furnaced in closed retorts or in reverberatory furnaces, and the charcoal or ash is treated as commonly practiced with sea-weed, char, or kelp, or the solution may be dialysed or fermented, (with the aid of yeast, if necessary,) in order to separate the salts from the gummy and saccharine matters. The new products are obtained from the residue left after the extraction of the salts by treating such residue with carbonate or hydrate of soda or other alkali, or with biborate of soda, (borax.) This operation may be performed in any suitable boilers—such, for example, as those used for boiling rags, esparto, or other paper-making materials—it being preferred by me to conduct the operation under a slight pressure. A glutinous or mucilaginous solution is formed which is filtered, strained, or otherwise separated from undissolved matters, and this solution may be sold as it is, or it may be more or less concentrated by evaporation. When required, it may be decolorized by bleaching or other suitable process. In many cases it may be found most convenient to have the residue left after the extraction of the salts combined in a dry state with the alkali or alkaline carbonate or biborate, the users preparing the solution themselves in a fresh state by boiling the compound with the requisite addition of water. For this purpose the residue is dried, and it and the alkali or alkaline carbonate or biborate are ground and mixed together in suitable proportions, and then packed for sale. The proportion of alkali or alkaline carbonate or biborate to the sea-weed residue should be what is found in practice to be just sufficient to dissolve the acid constituents. In practice about five pounds of soda-ash are generally sufficient for one hundred pounds of the wet residue; but the proportion will vary in different cases. When the solution has been separated from undissolved matters the latter on treatment with acids and alkalies and bleaching agents—as in the case of ordinary paper-making materials—yields a substance which may be advantageously used either alone or mixed with other materials for making paper, or card-board, or for other purposes. The solution in its more or less concentrated form or completely dried may be appropriately named "algin," and is probably a new compound, consisting of an acid which may be named "algic" acid, combined with the soda or other alkali employed, in which case algin may be regarded as an algate of the alkali. The alkali may be separated from the algin by means of a suitable acid or salt, which precipitates the algic acid as a jelly, and this jelly may be used as a nitrogenous food or as an ingredient of food. Algin and algic acid are distinguishable from all other known substances by characteristic chemical reactions, and they possess peculiar properties which render them advantageously applicable for many purposes. Among their various possible applications the following may be mentioned, namely: the dressing and stiffening of textile materials and fabrics; the thickening of coloring and other matters used in calico-printing and the mordanting of textile materials and fabrics; their use, instead of glue or of dung or dung substitutes, in connection with calico-printing and Turkey-red dyeing; the treatment otherwise of Turkey-red goods; the batching or preparing of jute and other textile materials; the emulsifying of oils or rendering them mixable with other liquids; the sizing and facing of paper or mixing with paper-pulp, papier-maché, and the like; their use as a substitute for gums or glue for adhesive purposes, for varnishing prints, and as a film for photographic purposes, instead of albumen, gelatine, or collodion; the agglutinating of lime, alumina, and other ingredients for plastic purposes, also of charcoal or small coal for filters, or for fuel, or use as non-conductors; the clarifying of wines and other liquids. For some purposes the algin or algic acid may be advantageously mixed or combined with gums—such as tragacanth, Arabic, or Senegal, or with albumen, gelatine, glycerine, starch, or dextrine, or with one or more of the following, namely: magnesia-salts, potash chromate and bichromate, potash-permanganate, mercury-chloride, potash and soda silicates, soda-phosphates, soda-stannate, soda-succinate, alkalies and alkaline salts, carbonates, sulphates, cyanides, ferrocyanides, ferri-cyanides, benzoic acid, benzoates, tannic acid, and gallic acid.

Having thus particularly described my said invention and the manner of performing the same, I have to state that I do not restrict myself to the precise details hereinbefore described, but that what I believe to be novel and original, and claim as my invention, is—

1. The process herein described of treating sea-weed, which consists in first extracting the salts from the sea-weed by washing, in then mixing about one hundred parts of the washed sea-weed with about five parts of an alkali, producing thereby a glutinous solution, and in finally separating this solution by filtering from the undissolved ingredients of the sea-weed, as specified.

2. As a new product of manufacture, the algic acid produced from sea-weed by an admixture of alkali with sea-weed from which the salts have first been extracted, as specified.

The foregoing specification of my improvements in the manufacture of useful products from sea-weeds signed by me this 15th day of December, 1885.

EDWARD CHARLES CORTIS STANFORD.

Witnesses:
JOHN J. LOVE,
Of 183 West George St., Glasgow, Law Clerk.
JOHN BLYTH,
Of 183 West George St., Glasgow, Law Apprentice.